(12) United States Patent
Narayanan et al.

(10) Patent No.: US 9,621,510 B2
(45) Date of Patent: Apr. 11, 2017

(54) CALL ROUTING BETWEEN ENHANCED AND LEGACY SYSTEMS

(71) Applicant: Avaya Inc., Santa Clara, CA (US)

(72) Inventors: Srinivasan Narayanan, Pune (IN); Sanjog Narayan Kotnis, Pune (IN)

(73) Assignee: Avaya Inc., Santa Clara, CA (US)

( * ) Notice: Subject to any disclaimer, the term of this patent is extended or adjusted under 35 U.S.C. 154(b) by 97 days.

(21) Appl. No.: 14/739,205

(22) Filed: Jun. 15, 2015

(65) Prior Publication Data
US 2016/0366093 A1    Dec. 15, 2016

(51) Int. Cl.
*H04L 29/12*    (2006.01)
*H04M 7/00*    (2006.01)

(52) U.S. Cl.
CPC ........ *H04L 61/106* (2013.01); *H04M 7/0066* (2013.01); *H04M 7/0075* (2013.01)

(58) Field of Classification Search
None
See application file for complete search history.

(56) References Cited

U.S. PATENT DOCUMENTS

| | | | |
|---|---|---|---|
| 6,275,574 B1* | 8/2001 | Oran | H04M 7/128 370/352 |
| 2004/0148416 A1* | 7/2004 | Aarnos | H04L 29/12066 709/230 |
| 2008/0160997 A1* | 7/2008 | Kim | H04W 8/02 455/433 |
| 2010/0226362 A1* | 9/2010 | Kim | H04L 12/14 370/352 |

* cited by examiner

*Primary Examiner* — Hong Cho
(74) *Attorney, Agent, or Firm* — Sheridan Ross P.C.

(57) ABSTRACT

Components of a telephone system often do not evolve in lock-step with other system improvements. For a variety of reasons, a component in a system may be operational to enable telephone calls utilizing a particular dialing format but be inoperable for calls utilizing a different format. Telephone number formats were initially numeric. The number of digits and format of the digits was often determined based on a country-specific dialing plan. Many countries have moved to more digits or alphanumeric formats (e.g., URIs). By capturing these enhanced addresses and generating an associated unique identifier, internal networks may utilize legacy numbering systems internally and, once the call reaches an edge device, route them based upon the enhanced address.

20 Claims, 9 Drawing Sheets

CALL ROUTING BETWEEN ENHANCED AND LEGACY SYSTEMS

FIELD OF THE DISCLOSURE

The present disclosure is generally directed toward telephone call processing.

BACKGROUND

Legacy systems exist in various forms. Legacy telephony systems may be limited to only numeric characters and typically only a certain number of digits. In the United States, legacy telephone numbers are ten digits; in Germany, seven; and, in India, thirteen. In contrast, enhanced systems may utilize more digits (e.g., Germany's fifteen digits and India's eight digits). Enhanced systems may also utilize alphanumeric and special characters, such as addresses utilizing a Uniform Resource Locator (URL), Uniform Resource Name (URN), or Uniform Resource Identifier (URI). Compatibility issues between the legacy and enhanced system are commonplace.

Legacy systems are improved to become enhanced systems, such as when countries expand numbering digits (e.g., when India transitioned from a seven-digit public switched telephone network (PSTN) local number to an eight-digit number or Germany's move from the E.164 thirteen digits format to the E.164 fifteen digit format). Often upgraded switches are required to enable parsing of more digits. The switches in a PSTN are commonly upgraded to switches that support the legacy format and, upon an event such as completion of upgrades to a central exchange, the enhanced functionally is then activated.

In the case of enterprise systems, leading digits are dropped from the longer number and are then converted to a shorter number for routing inside the enterprise. While this may allow a call to be presented to an internal component, it does not allow for the longer number to be dialed.

For alphanumeric numbers, systems utilize a mapping table. As a result, an incoming call may be routed internally, but it cannot be dialed out without knowing a corresponding destination number (e.g., an E.164 number).

SUMMARY

It is with respect to the above issues and other problems that the embodiments presented herein were contemplated. Advantages may be realized by putting the dialing intelligence, at least in part, in an edge device in accordance with embodiments described herein In one embodiment, incoming calls are received. The edge device stores the incoming enhanced address (e.g., additional digits, URI, etc.) in a contact store accessible on a network and maps a unique short number to the address (unique ID). The edge device may then send the unique ID to components within its own network (e.g., an enterprise network). To other devices within the network, a display showing the calling party will show the original calling party's name and number, due to the signaling in the Session Initiation Protocol (SIP) Contact header. However, internally, it is the unique ID that is stored as the calling party number. The call then traverses the network and to the endpoints utilizing the unique ID as the call's "to" address. In order to place a call back to the calling number, the unique ID is also used as the "to" the address. The edge device looks up the stored URI using the unique ID and then the edge device may then use the URI to place the call.

In another embodiment, outgoing calls are placed to the URI of a SIP message. In one embodiment, an endpoint that received a call from the external party calls back. The contact log of the endpoint device itself may have the unique ID mapped to the external entity. Calling the unique ID of the external device will ensure that the call gets routed across the network and reaches the edge device. The edge device then replaces this unique ID with the real external number/alphanumeric URI and routes the call thereto.

In another embodiment, an endpoint that has not received a call from a particular external party, places a call thereto. However, the contact store has a record for the external party. The endpoint performs a lookup and the contact store returns the unique ID mapped to the external party, as the contact store has a record of the external party based upon a prior call. This unique ID is then used for routing across the enterprise in a similar manner as outlined in the above embodiments.

In another embodiment, an extension calls a number or an alphanumeric URI that has not been called before or otherwise has no record thereof. The endpoint performs a lookup on the unique ID and the contact store fails to find a matching enhanced address. The contact store creates an entry and returns the unique ID. The endpoint places a call destined to this newly created unique ID. The unique ID gets routed across the network and reaches the edge device. The edge device accesses the contact store based upon the unique ID entry, which causes the contact store to return the enhanced number to dial out.

The contact store may solely contain records mapping the unique ID to the enhanced address, such as in a simple database or flat file, or be combined with other data repositories, such as an LDAP or other directory repository. The contact store may be utilized by other services, such as call logs, recordings, report generators, etc. to access the unique ID and/or the enhanced address. Other services may also use the enhanced address and/or the unique ID in the contact store, such as to provide call blocking, routing, and other services.

In one embodiment, a system is disclosed comprising: an edge device logically connecting an external network to an internal network and facilitating calls therebetween; an internal endpoint logically connected to the internal network; a contact store, logically attached to the internal network, configured to maintain a translation record associating an external address of an external endpoint logically attached to the external network to a unique identifier; and wherein the internal endpoint places an outbound call to the unique identifier and the edge device routes the call to the external network utilizing the external address.

In another embodiment, a method is disclosed, comprising: receiving at an internal endpoint on an internal network, an outbound call comprising an enhanced address to an external endpoint on an external network; creating an unique identifier associated with the enhanced address, wherein the at least one component required to route the outbound call to the edge of the internal network is operable to route the outbound call to the edge of the internal network utilizing the unique identifier; storing a record comprising the unique identifier and the associated enhanced address in an accessible contact store.

In another embodiment, another method is disclosed, comprising: receiving an inbound call from an external network at an edge device configured to logically connect the external network to an internal network and facilitate calls therebetween; routing the inbound call to an internal endpoint, of a number of internal endpoints, identified by an address of the inbound call; accessing an enhanced address associated with the originator of the inbound call; creating a unique identifier; storing, in a contact store accessible upon the internal network, a translation record associating the external address with the unique identifier; and routing the inbound call to an internal endpoint identified as the destination for the inbound call.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium," as used herein, refers to any tangible storage that participates in providing instructions to a processor for execution. Such a medium may take many forms, including, but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid-state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module," as used herein, refers to any known or later-developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices that may be shown in block diagram form, and are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
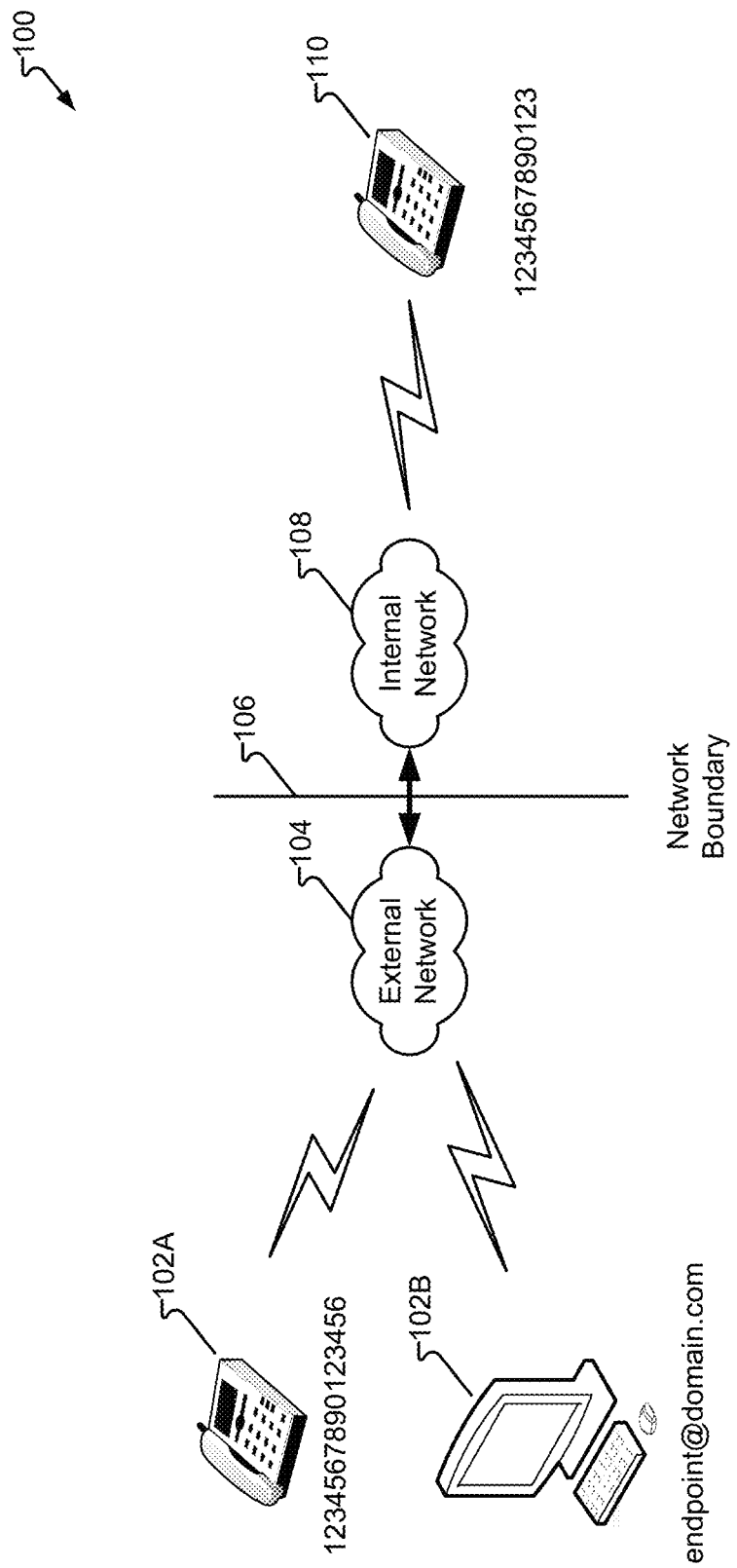
FIG. 1 depicts a first communications system in accordance with embodiments of the present disclosure.

FIG. 1 depicts first communications system 100 in accordance with embodiments of the present disclosure. In one embodiment, the first communications system 100 comprises a first network, internal network 108 and second network, external network 104 and endpoints attached thereto. In another embodiment, the first communications system 100 comprises a first network, external network 104 and second network, internal network 108 and endpoints attached thereto. Network boundary 106 delineates the internal and external networks.

The points attached to external network 104 may comprise one or more types of endpoint identities and/or devices compatible with various technological advances. For example, endpoints 102 may include one or more legacy endpoints implementing technology that may have become obsolete recently or many years ago. External endpoints 102 may be designed for a specific network, such as network associated with a particular country, enterprise, and/or other target network.

In one embodiment, external endpoint 102 comprises an enhanced address that comprises additional digits compared to the digits utilized by at least one component of internal network 108. External endpoint 102 may also comprise a different dialing format instead of or in addition to a difference in the number of digits utilized. For example, certain numbers (e.g., zero, nine, one) cannot be used in certain dialing formats as a first digit, however different dialing formats do allow for all or different digits to be utilized as a first digit.

In another embodiment, external endpoint 102B is embodied as a computer terminal utilizing an address comprising alphanumeric characters, such as an email address, URI, telnet, and/or other format comprising characters beyond numbers alone. External endpoints 102 logically attached to external network 104. External network 104 may comprise private networks and/or public networks. External network 104 may include PSTN, Internet, cellular network, Wi-Fi, Bluetooth, and/or other device networks.

Internal network 108 comprises systems and devices executing programs and/or other instructions to handle telephone calls, and optionally other communications (e.g., video, text, data, combinations thereof, etc.). Internal network 108 may comprise devices, such as private branch exchange (PBX), switches, routers, and/or other devices. Internal network 108 may utilize an edge device as a first point of contact to external network 108. The edge device, described more fully with respect to FIG. 2, may comprise a session manager a session border controller and/or other edge device. Internal network 108 has attached thereto one or more internal endpoints, such as internal endpoint 110. Internal network 108 and/or internal endpoint 110 may operate with certain limitations, such as a dialing format incompatible with the enhanced addresses associated with external endpoints 102. For example, internal endpoint 110 may comprise a telephone that is only capable of natively dialing numbers, even though letters may be associated with dialed numbers. In another example, internal network 108 comprises equipment configured and/or limited to a dialing format incompatible with the dialing format of external endpoints 102, such as the assumption that after external endpoint 102A has dialed thirteen digits, the dialing is complete. However, the intended destination of such an outbound call (e.g., external endpoint 102) utilizes a sixteen-digit address and, after dialing only thirteen digits, the call fails.

In another embodiment, internal network 108 incorporates systems and methods to allow enhanced address dialing and routing and the placing of calls to enhanced addresses. Internal network 108 utilizes a unique address as a substitute for the enhanced address. The unique address is at least system-unique and optionally globally unique, such as may be implemented by enterprises utilizing a number of unique identifier generation components. The unique ID may be a serial number, truncated version of an enhanced number, or implement any other means of generating a unique identifier based on or not based on the enhanced address. For example, a telephone number may comprise certain digits that are less meaningful to the user, such as a country code or city code. In another implementation, a city code or country code may be the most meaningful and other digits truncated. However, it should be appreciated by those of ordinary skill in the art that other means of generating the unique identifier, including random number generation, may be implemented as a matter of design choice to provide internal network 108 with a unique identifier for each inbound and outbound call. In another embodiment, the unique ID may comprise a static portion, such as enhanced addresses with @abcCompany.com start with 1, +993 start with 2, etc.

Figure 2:
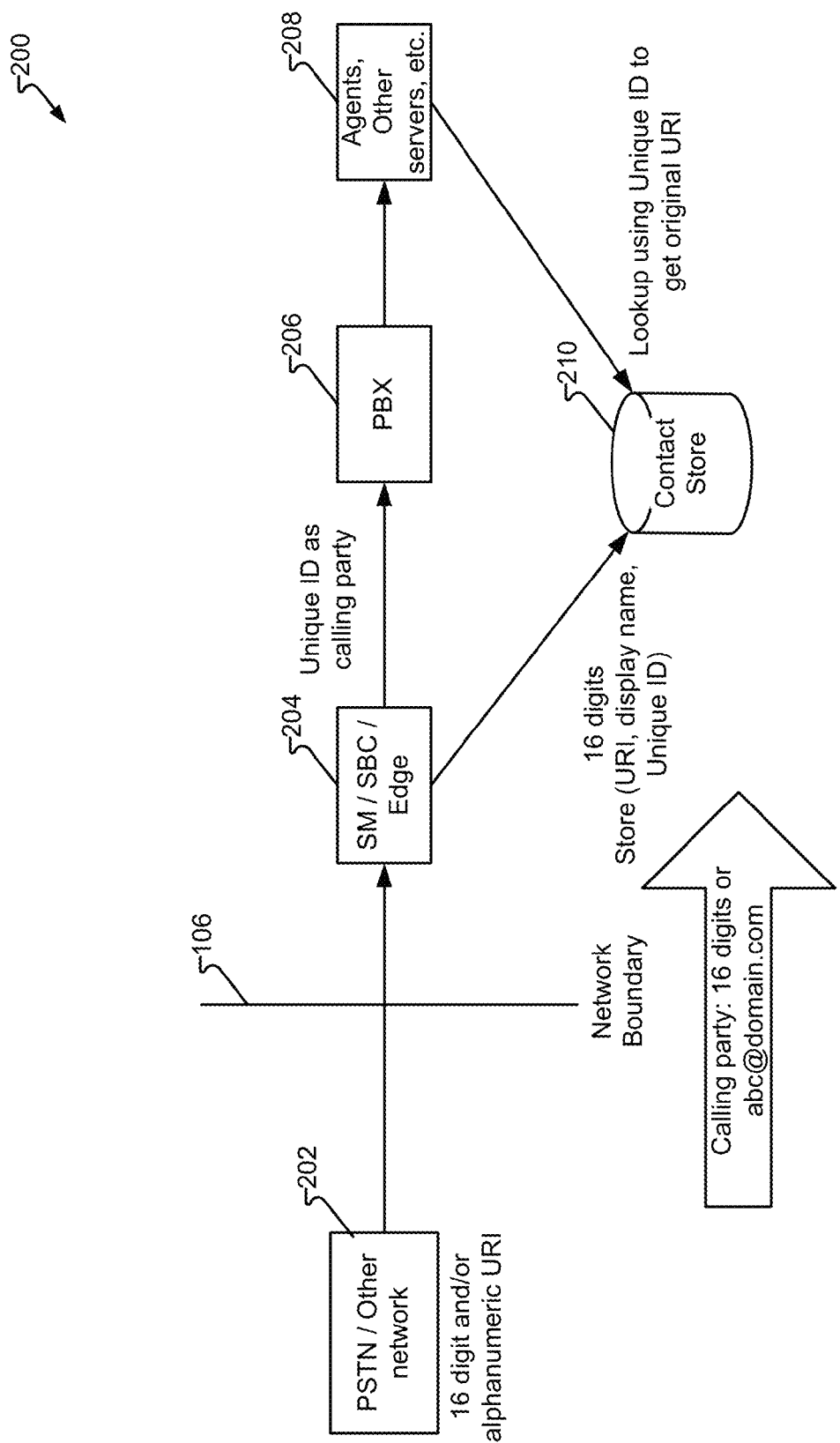
FIG. 2 depicts a second communications system in accordance with embodiments of the present disclosure.

FIG. 2 depicts second communications system 200 in accordance with embodiments of the present disclosure. In one embodiment, second communications systems 200 processes an inbound call received from external network 104, more specifically interface portion 202 to a PSTN and/or other network. Calls, as used herein, include but are not limited to switch-based telephone calls, generally associated with PSTN calls, and packet-based calls, generally associated with Internet-based calls or voice over Internet protocol (VoIP). Calls may include acoustic-based data (e.g., facsimile transmissions). In other embodiments, calls comprise data-based communications, such as text, files, video, and/or other signals. Calls utilizing packets IP may contain header information comprising "to" information to identify the destination of the call. Calls utilizing switching may comprise "to" information in a portion of a signal. Calls generally comprise "from" information identifying the origination of the call. An incoming call comprising a "from" address utilizing an enhanced format, such as sixteen digits compared to a legacy system utilizing thirteen digits or an alphanumeric system (e.g., email, URI, etc.).

The inbound call crosses network boundary 106 and initially reaches edge device 204. Edge device 204 may additionally or alternatively comprise one or more of a session manager, session boarder controller, security controller, firewall, gateway, and/or other edge devices. Edge device 204 creates, or causes the creation of, a unique identifier for the calling party. The unique identifier is created to be compatible with other systems within internal network 108 and/or endpoints attached thereto. In one embodiment, PBX 206 is one internal component presently inoperable to accommodate the enhanced address.

Edge device 204 logically connects to one or more internal components, such as PBX 206, which then continues to route the call to the endpoint address thereto, such as endpoint 208. The unique ID is utilized as the calling party. As will be described more completely with respect to the remaining figures, the unique ID may then be utilized for local address books or other directory usage in order to identify the source of the inbound call, such as to facilitate initiation of a return outbound call.

In order to maintain the association between the unique ID and the enhanced address, a record is created and stored in contact store 210. The record is created to utilize the unique ID as the key to access the record comprising the enhanced address, and optionally other information associated with the calling party (e.g., user name, company name, etc.). Endpoint 208 may then wish to retrieve the enhanced address and access contact store 210 to access the translation record and the enhanced address associated with the unique ID.

As a benefit of second communications system 200, calling systems may present caller identification (caller ID) utilizing the unique ID for the inbound call. In other embodiments, internal network 108 may comprise the ability to present the enhanced address as the caller identification but not process the caller identification as a "to" address for an associated outbound call. In such embodiments, second communications system 200 may utilize the enhanced address as the caller identifier was still utilizing the unique ID as the "from" address. As can be appreciated, endpoint 208 initiating a call back then causes the unique ID to be associated with the outbound call and then translated to the enhanced address by its device 204.

Figure 3:
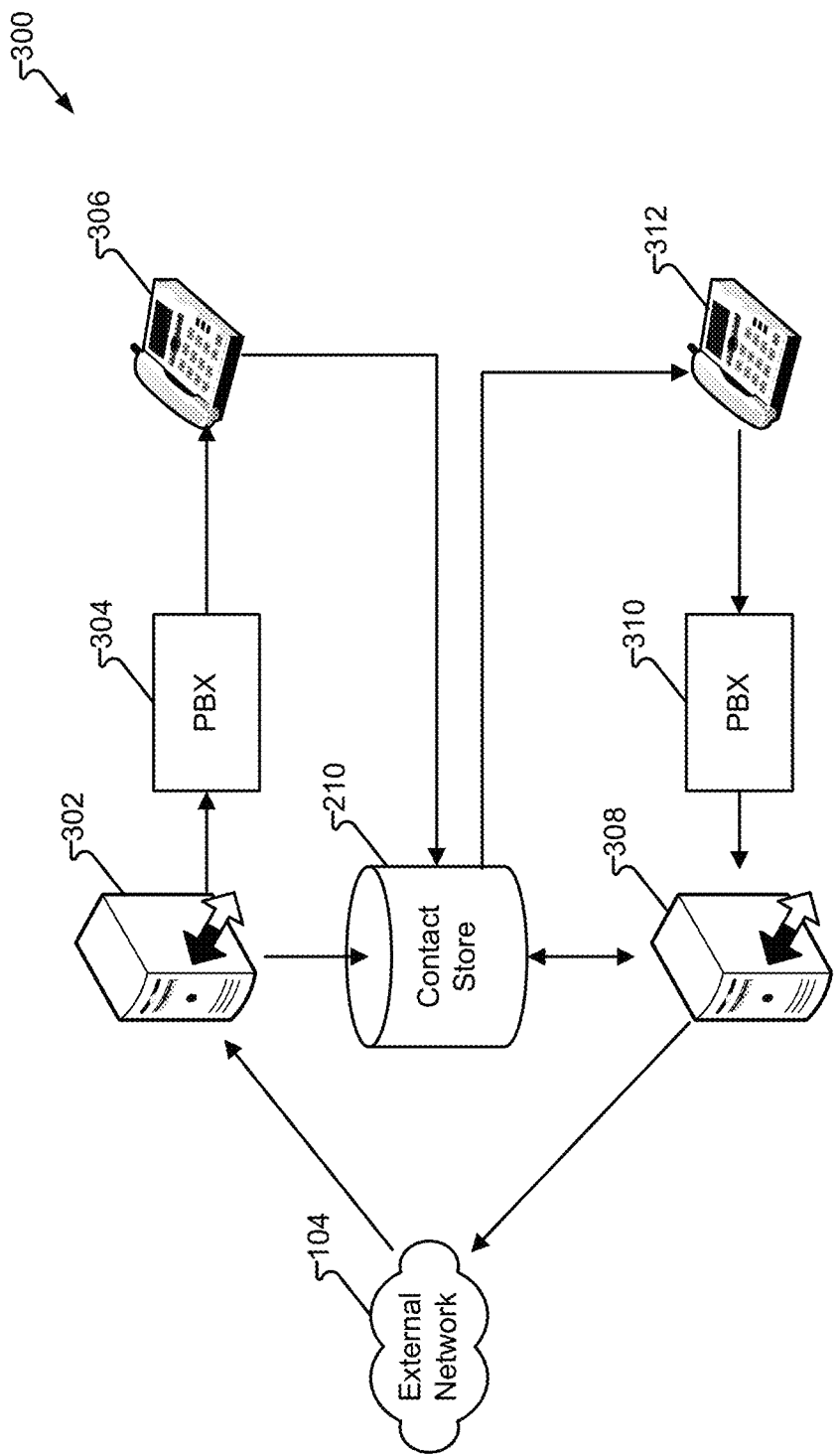
FIG. 3 depicts a third communications system in accordance with embodiments of the present disclosure.

FIG. 3 depicts third communications system 300 in accordance with embodiments of the present disclosure. In one embodiment, the communications system 300 comprises components for inbound and outbound call processing. In one embodiment, external network 104 originates an inbound call. In one embodiment, internal network 108 comprises components 302, 304, 210, 308, 310 for the routing and management of calls. Internal endpoint 306 and internal endpoint 312 provide terminal points for the destination and origination of calls, respectively.

In one embodiment, external network 104 provides an incoming call utilizing an enhanced address. Edge device 302 initially receives the incoming call. Edge device 302 determines and/or has knowledge that the incoming call comprises a "from" address in an enhanced format incompatible with components of system 300, such as PBX 304 and or other internal components. Edge device 302 then causes the generation of the unique ID and the creation of the transaction record in contact store 210 to associate the enhanced address with the unique ID. Device 302 then routes the call to systems such as PBX 304. Internal endpoint 306 then receives the call for answering, answering by an answering device, or other operations as may be determined by a user operating internal endpoint 306 and/or the system configurations available thereto.

Internal endpoint 306 may then access contact store 210 to retrieve the enhanced address from an associated transaction record indexed by the unique ID for the incoming call. In another embodiment, innternal endpoint 306 may access the contact store 210 to retrieve the enhanced address at other times, such as before or after receiving the call. Internal endpoint 306, if compatible to display the enhanced address, may then present to the user the caller identification utilizing the enhanced address as the "from" address of the inbound call.

In another embodiment internal endpoint 312 wishes to place a call to the enhanced address received in the inbound call and answered by internal endpoint 306. Internal endpoint 312 receives user input indicating the unique ID for the outbound call. In one embodiment internal endpoint 312 looks up the enhanced address utilizing the unique ID to index a transaction record stored in contact store 210. Endpoint 312 then places the call, utilizing the unique ID, to conventional components, such as PBX 310. The conventional components, such as PBX 310, route the call to edge device 308 still utilizing the unique ID as the "to" for the outbound call. Edge device 308 then accesses a transaction record within contact store 210 to retrieve the enhanced address utilizing the unique ID as an index. Edge device 308 then routes the call to the external network 104 utilizing the enhanced address in the "to" address field for the outbound call.

In another embodiment, components of third communications system 300 may be the same components utilized for both inbound and outbound call processing. For example, edge device 302 and edge device 308 may comprise the same device, similarly PBX 304 and PBX 310 and/or internal endpoint 306 and internal endpoint 312 may comprise a single PBX and/or endpoint, respectively.

Figure 4:
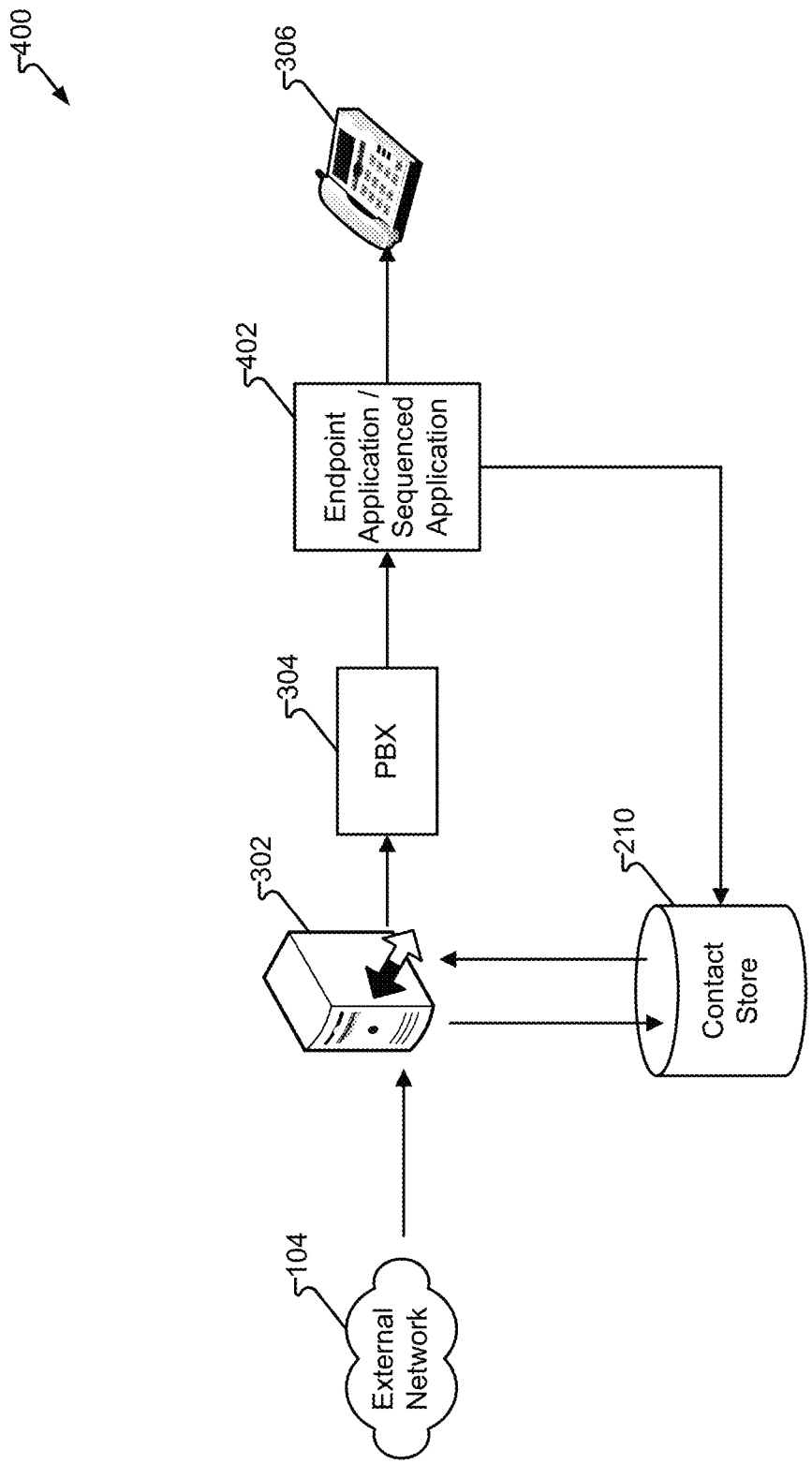
FIG. 4 depicts a fourth communications system in accordance with embodiments of the present disclosure.

FIG. 4 depicts fourth communications system 400 in accordance with embodiments of the present disclosure. In one embodiment, communications system 400 illustrates a system deploying an application to provide lookup features and/or other functionality for internal endpoint 306 and the reception and processing for an inbound call. Endpoint 306 may comprise a telephone, preferably a digital telephone, configured to launch applications, such as an endpoint application and/or sequenced application 402. In another embodiment, endpoint 306 comprises a computational device configured to execute endpoint application and/or sequenced application 402.

In one embodiment, external network 104 originates an inbound call. Edge device 302 receives the inbound call and determines, or has knowledge that, components within fourth communications systems 400 are incompatible with the enhanced address of the received call. Edge device 302 generates or causes the generation of the unique ID and further causes the storage of a transaction record in contact store 210. The transaction record associating the unique ID with the enhanced address received from the inbound call. Edge device 302 then routes the inbound call utilizing the unique ID as the "to" address field. Endpoint application and/or sequenced application 402 may then access contact store 210 to retrieve the enhanced address from the transaction record utilizing the unique ID as an index. With the enhanced address, endpoint 306 directly or with benefit of endpoint application and/or sequenced application 402 may then present the enhanced address as the "from" address associated with the inbound call.

As a benefit, components that are operable to process the inbound call with the enhanced address are avoided but substantially concurrent with delivery of the call to endpoint 306. Endpoint 306 is enabled to present the enhanced address as the "from" caller identification. Optionally, endpoint application and/or sequenced application 402 may also present or cause the presentation of the unique ID on endpoint 306.

Figure 5:
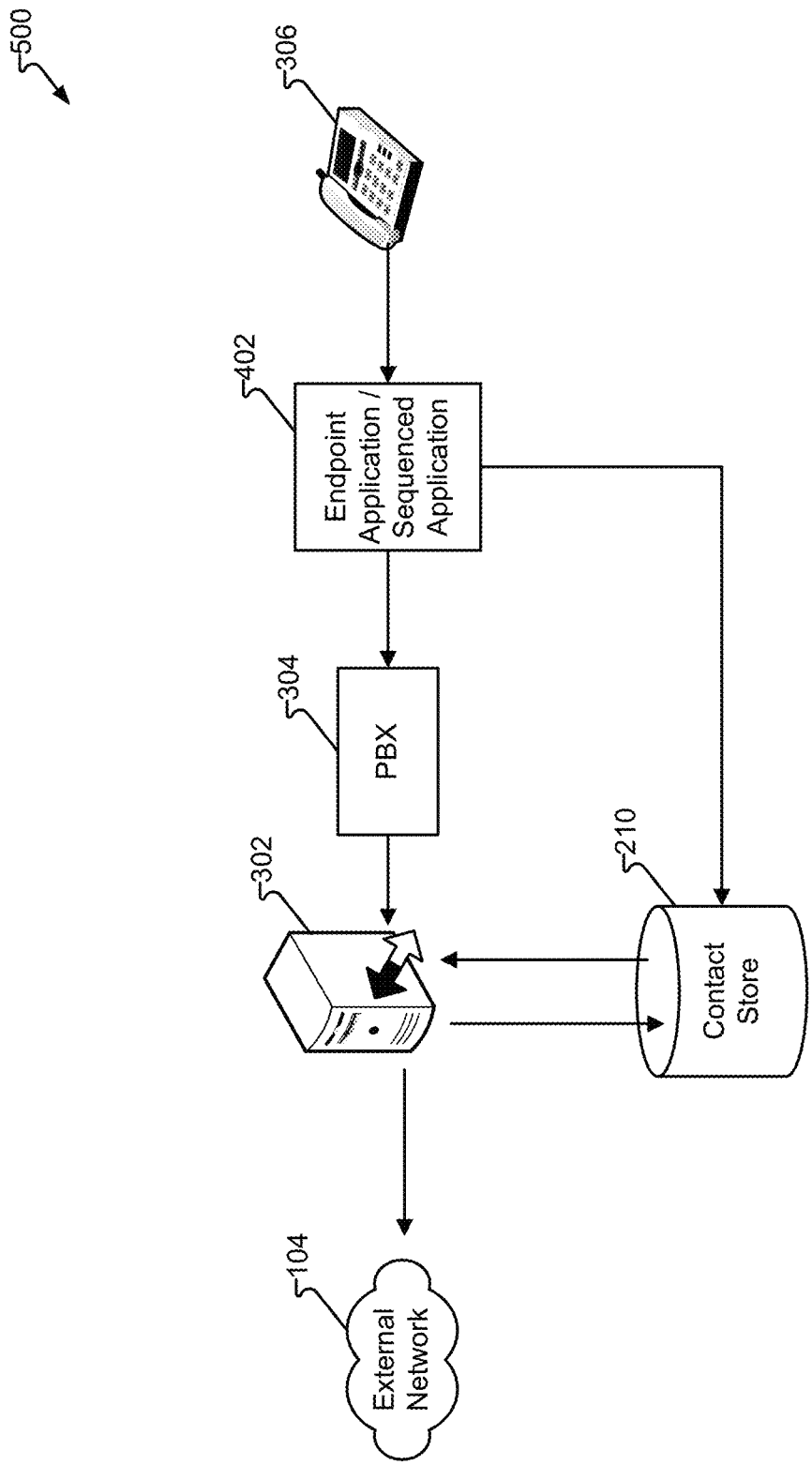
FIG. 5 depicts a fifth communications system in accordance with embodiments of the present disclosure.

FIG. 5 depicts fifth communications system 500 in accordance with embodiments of the present disclosure. In one embodiment, communications system 500 illustrates a system deploying an application to provide lookup features and/or other functionality for internal endpoint 306 and the reception and processing for an outbound call. In one embodiment, endpoint 306 is operable to receive the unique ID and not operable to receive the enhanced ID as an input associated with an outbound call. Endpoint application 402 and/or sequenced application 402 receives the input unique ID and accesses the enhanced address from a transaction record within contact store 210.

In another embodiment, contact store 210 presently has no translation record associated with a particular outbound call. Endpoint 306, alone or with benefit of endpoint application and/or sequenced application 402, receives the enhanced address for an outbound call. Endpoint application and/or sequenced application 402 causes the generation of the unique ID and the storage of a transaction record having the unique ID and the associated enhanced address in contact store 210.

Endpoint application and/or sequenced application 402 then routes the call to PBX 304 and/or other internal communications equipment. Upon reaching edge device 302, edge device 302 accesses contact store 210 and retrieves the translation record utilizing the unique ID routed through PBX 304. Edge device 302 then extracts the enhanced address from the translation record for utilization in the "from" field and routes the call on to external network 104.

As can be appreciated by those of ordinary skill in the art, endpoint application and/or sequenced application 402 may generate the unique ID or cause the generation of the unique ID. For example, endpoint application and/or sequenced application 402 may execute a call to another application for the purpose of generating the unique ID. Endpoint applications and/or sequenced application 402 may be co-processed on the same device as endpoint 306 or distinct therefrom. For example, an agent terminal may be configured to execute endpoint application and/or sequenced application 402 as well as to provide dialing services and other connectivity services of endpoint 306.

Figure 6:
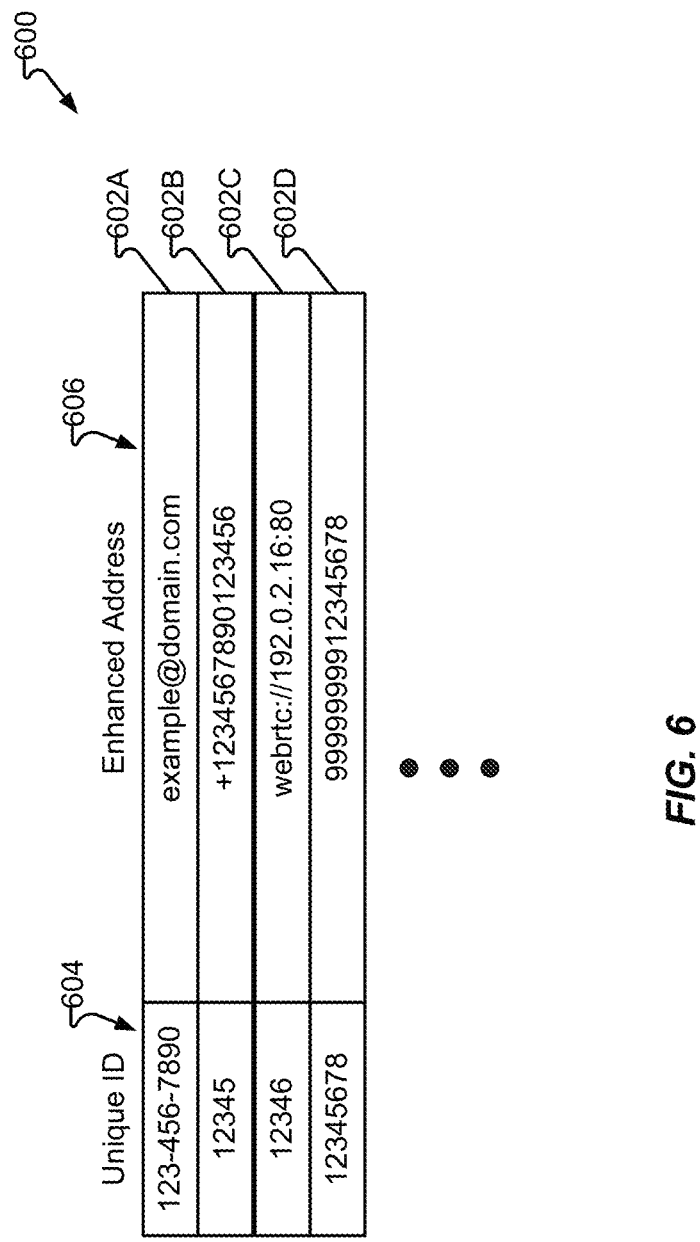
FIG. 6 depicts a table of a contact store in accordance with embodiments of the present disclosure.

FIG. 6 depicts table 600 of contact store 210 in accordance with embodiments of the present disclosure. In one embodiment, table 600 comprises at least a portion of data stored within contact store 210. Table 600 comprises a number of records 602 for inbound and/or outbound calls to associate unique IDs 604 with their respective enhanced addresses 606.

It should be appreciated that table 600 may comprise additional information, such as caller name, callee name, company name, and/or one or more additional fields determined as a matter of implementation (e.g., account number, matter number, time to call, position, role, etc.). The location of table 600 and contact store 210 is an accessible location to components of internal network 108 and may be specifically located as a matter of design choice. In one embodiment, one or more edge devices 204, 302, 308 hosts contact store 210. In another embodiment, a dedicated data server, shared data server, accessible data storage (e.g., cloud, service provider, etc.) hosts contact store 210.

Figure 7:
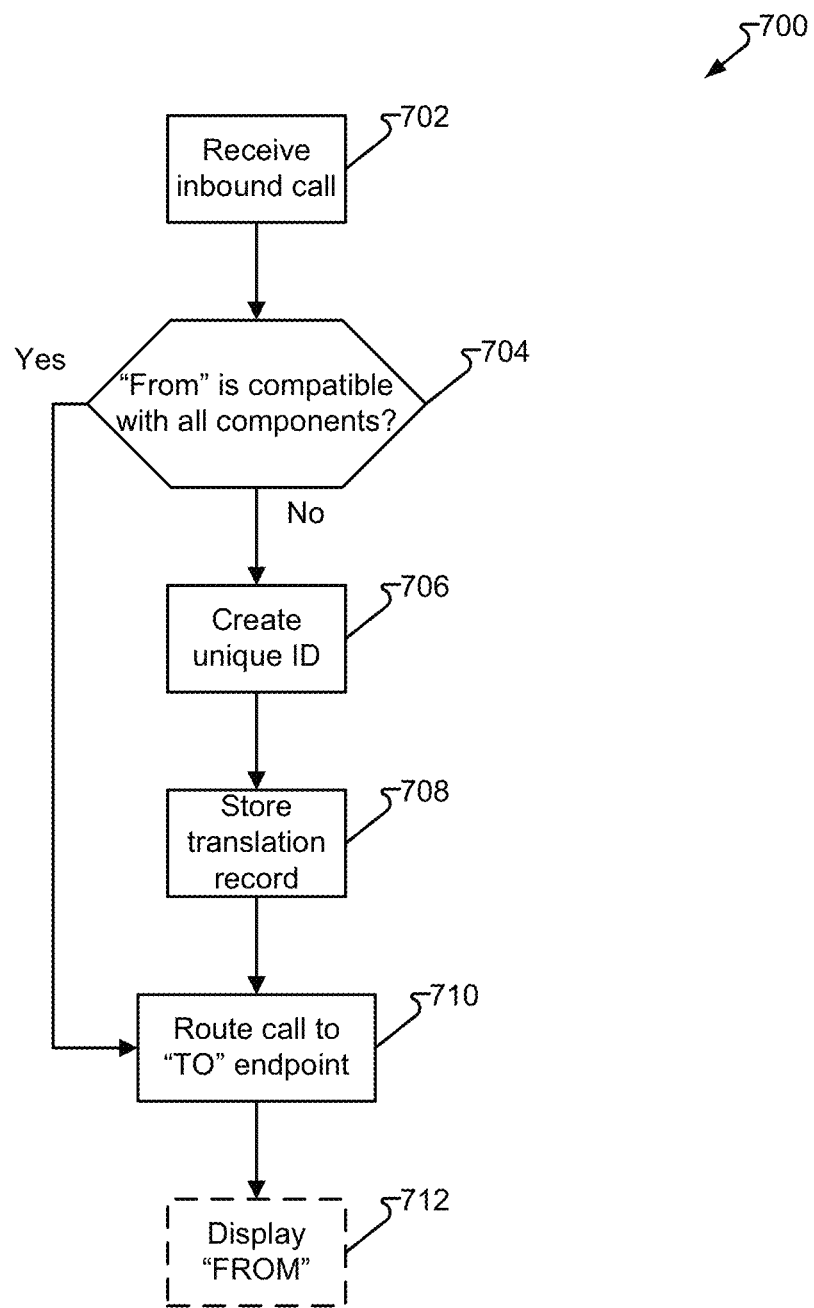
FIG. 7 depicts a first process in accordance with embodiments of the present disclosure.

FIG. 7 depicts first process 700 in accordance with embodiments of the present disclosure. In one embodiment, process 700 begins at step 702 receiving an inbound call, such as device 204 receiving an inbound call from PSTN 202. Next step 704 determines whether the "from" is compatible with the components of internal network 108 and/or internal endpoints, such as internal endpoint 110. If step 704 is determined in the affirmative processing may continue normally, such as to step 710. If step 704 is determined in the negative, processing continues at step 706 whereby the unique ID is created.

Next, step 708 stores a translation record whereby the unique ID is associated with the enhanced address of the inbound call received at step 702. Next step 710 routes the call to the indicated "to" address identified by the inbound call. As a benefit, components of internal network 108 that are not operable to process the inbound call utilizing the enhanced address associated with the inbound call may be avoided and the call routed as if it were a legacy call.

After step 710, the call is answerable by an endpoint, such as internal endpoint 110, in the normal fashion including routing, forking, answering by an answering system, answering by an automated agent, answering by a human operator, and/or other telephony operation. Optionally, step 712 may be executed to provide color identification associated with the inbound call. If the enhanced address has been provided to the endpoint and is operable to be displayed by the endpoint, the endpoint may display the color identification as the enhanced address. In another embodiment, if the enhanced address has not been provided, the unique ID may be displayed as the color identification. In yet another embodiment, if the enhanced address has not been provided the endpoint may access the data store with the unique ID and retrieve the enhanced address for display. In still another embodiment, at least one of the enhanced address and the unique ID is utilized to access a translation record comprising a secondary identifier for presentation as a caller ID, such as the caller's name, company, etc.

Figure 8:
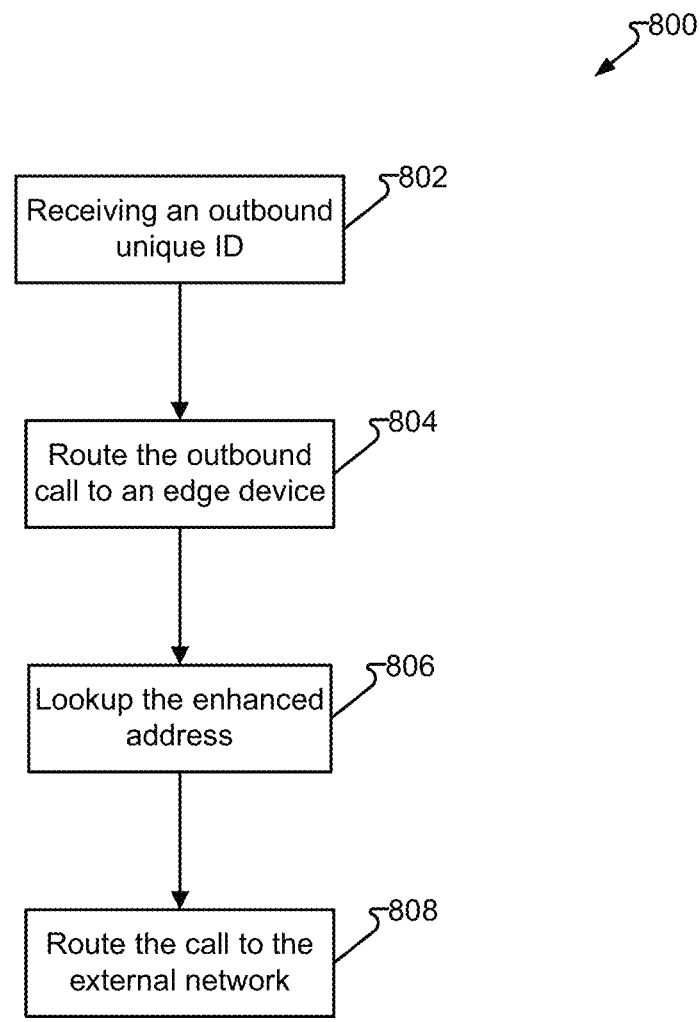
FIG. 8 depicts a second process in accordance with embodiments of the present disclosure.

FIG. 8 depicts second process 800 in accordance with embodiments of the present disclosure. In one embodiment, process 800 is executed upon receiving the indication of the creation of an outbound call to an enhanced address. Process 800 begins with step 802 receiving an outbound unique ID. For example, an agent, user, or other human operator may input the unique ID onto a keypad of a telephone, select a name from a list on a computer terminal, input indicia of a unique ID (e.g., speed dial number), or otherwise indicate the recipient of a call and further associate it with a unique ID.

Next, step 804 routes the outbound call to an edge device. The routing of the call may pass various components, such as PBX 206, before reaching edge device, such as edge device 204. The routing of the call utilizes the unique ID as a format for a telephone number compatible with the internal components of internal network 108. Step 806 looks up the enhanced address from a data store utilizing the unique ID as an index to retrieve the correct record having the targeted enhanced address. Step 808 then routes the call to the external network utilizing the enhanced address as the "to" address identifier. Step 808 may be executed by an edge device, such as edge device 204, an endpoint, such as internal endpoint 306, 312, 110, and/or other component operable to retrieve the enhanced address without causing any intermediate component, which is unable to process the enhanced address, to attempt to utilize the enhanced address.

Figure 9:
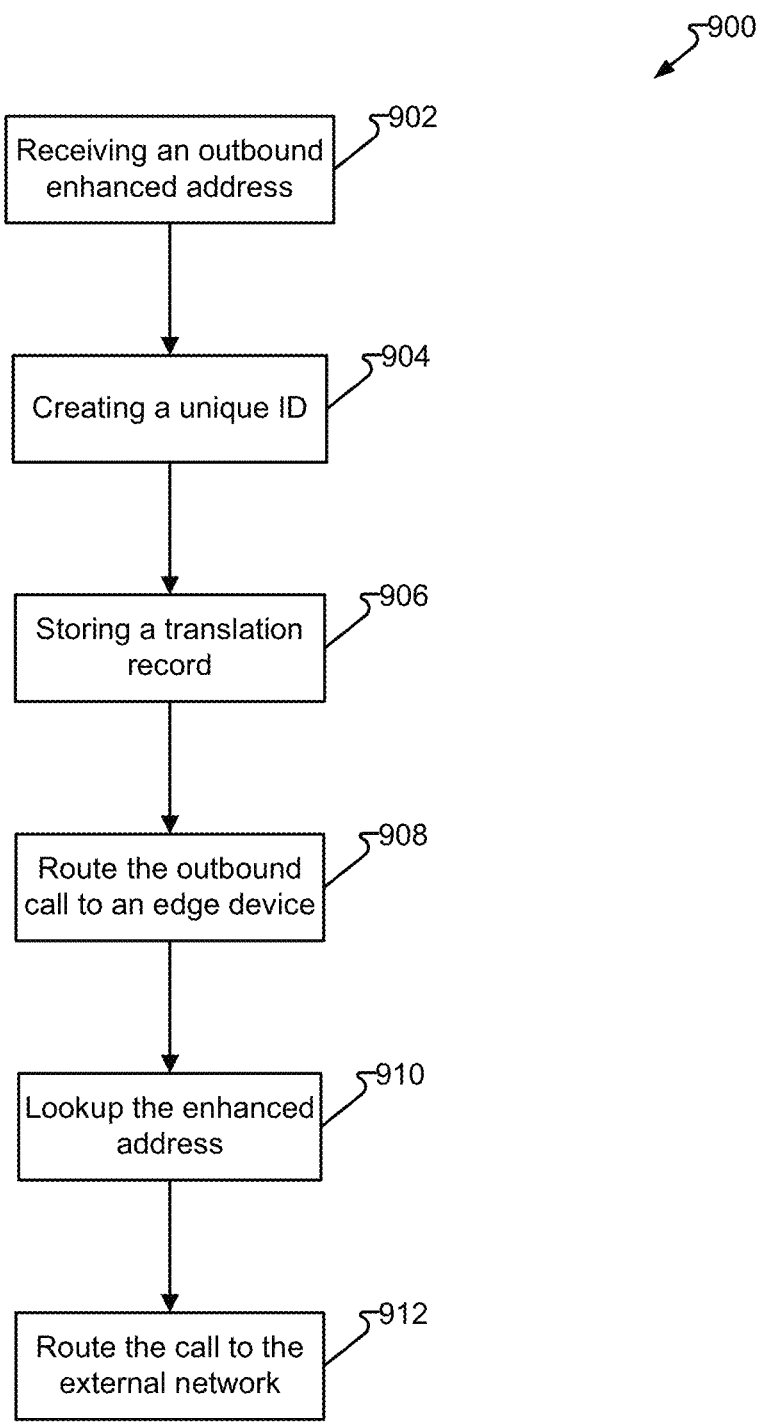
FIG. 9 depicts a third process in accordance with embodiments of the present disclosure.

FIG. 9 depicts third process 900 in accordance with embodiments of the present disclosure. In one embodiment, process 900 begins at step 902 receiving an outbound call having an enhanced address. Step 902 may be performed by an operator inputting, selecting, or otherwise indicating a destination ("to") utilizing an enhanced address. Next, step 904 creates a unique ID associated with the outbound call and more particularly the enhanced address thereof.

Step 906 stores the unique ID and the enhanced address in a translation record in an accessible data storage, such as contact store 210. Step 908 routes the outbound call to an edge device through various internal components of internal network 108 and utilizing the unique ID as the "to" address. Internal components may include, for example PBX 206, which is presently unable to process calls utilizing the enhanced address.

The outbound call proceeds through components of the internal network and is eventually routed to an edge device, such as edge device 302, 308. The edge device then accesses the data store and retrieves the enhanced address from a record indexed by the unique ID. The edge device then routes the call to the external network in step 912. The routed call comprising the enhanced address in the "to" field of the outbound call.

In another embodiment, the record associated with a unique ID may be modified, such as by deleting and/or modifying the record. For example, an enhanced address associated with a unique ID may be altered to reflect a change in the enhanced address associated with the same party without requiring the creation of a new record. As a further embodiment, a record may be deleted, such as when an updated record is created with a new record and the old record is no longer used. Such modifications or deletions may be automated to purge records that have been unaccessed for a predetermined period of time or to merge a plurality of records having the same enhanced address. Manual modification and deletions may also be provided to correct errors or otherwise update records or removed unneeded records.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU), or logic circuits programmed with the instructions to perform the methods (FPGA). These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium, such as a storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, routed, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A system, comprising:
   a contact store programmed to maintain a translation record associating an address of a second endpoint connected to a second network with a unique identifier used for addressing a first endpoint connected to a first network that uses a different addressing scheme than the second network; and
   an edge device with access to the contact store thereby enabling the edge device to intercept a call placed by the first endpoint connected to the first network and directed toward the second endpoint connected to the second network and address the call to the second endpoint connected to the second network even though the first endpoint connected to the first network used the different addressing scheme to dial the second endpoint connected to the second network.

2. The system of claim 1, wherein the first endpoint connected to the first network is further configured to, upon receiving a user input therein indicating initiation of a call to the unique identifier, access the translation record to retrieve the address of the second endpoint connected to the second network utilizing the unique identifier, and route the call utilizing the address of the second endpoint connected to the second network to the edge device.

3. The system of claim 1, wherein the edge device is further configured to receive the call from the first endpoint connected to the first network addressed to the unique identifier, access the address of the second endpoint connected to the second network from the translation record, and route the call to the address of the second endpoint connected to the second network.

4. The system of claim 1, wherein the edge device, prior to the routing of the call to the address of the second endpoint connected to the second network, receives a call from the second endpoint connected to the second network, and creates the translation record utilizing the address of the second endpoint connected to the second network.

5. The system of claim 4, wherein the edge device is further configured to determine that at least one component of the first network is inoperable to process the call to the second endpoint connected to the second network utilizing and, in response to the determination, causes the creation of the unique identifier.

6. The system of claim 5, wherein the second endpoint connected to the second network is configured to access the contact store to retrieve the address of the first endpoint connected to the first network from the translation record accessed utilizing the unique identifier.

7. The system of claim 4, wherein the edge device is further configured to route the received call from the second endpoint connected to the second network utilizing the unique identifier as the address of the second endpoint connected to the second network.

8. The system of claim 1, wherein the second network comprises at least one component inoperable to accommodate calls utilizing an address having a format equivalent to the format of the address utilized by the first endpoint connected to the first network.

9. The system of claim 8, wherein the at least one component inoperable to accommodate calls to any address having a format equivalent to the format of the address utilized by the second endpoint connected to the second network comprises a private branch exchange (PBX) logically located between the edge device and the first endpoint connected to the first network.

10. The system of claim 8, wherein:
the first endpoint connected to the first network is configured to place a call to a new address utilizing the different addressing scheme and cause the unique identifier to be created, place the call via the at least one component inoperable to accommodate calls to any address utilizing the different addressing scheme, and cause the creation of the translation record comprising the new address and the unique identifier; and
the edge device, upon receiving via the at least one component inoperable to accommodate calls to any address utilizing the different addressing scheme, routes the call to the second endpoint connected to the second network utilizing the new address retrieved from the contact store associated with the unique identifier.

11. A method, comprising:
receiving at an endpoint connected to a first network, a call for an endpoint connected to a second network, the endpoint connected to the first network utilizing a first address scheme different from a second addressing scheme utilized by the endpoint connected to the second network;
creating a unique identifier associated with the address of the endpoint connected to the second network, wherein the at least one component required to route the call from the endpoint connected to the first network to an edge device at the edge of the first network utilizing the unique identifier;
storing a record comprising the unique identifier and the associated address of the endpoint connected to the second network in an accessible contact store;
receiving the call from the endpoint connected to the first network, by the at least one component required to route the call to the edge device is inoperable to route the call from the endpoint connected to the first network utilizing the address of the endpoint connected to the second network, and routing the call from the address of the endpoint connected to the first network to the edge device utilizing the unique identifier;
receiving the call from the address of the endpoint connected to the first network, by the edge device, and accessing the address of the endpoint connected to the second network from the record in the contact store; and
routing the call from the edge device to the endpoint connected to the second network utilizing the accessed address of the endpoint connected to the second network from the contact store.

12. The method of claim 11, further comprising determining that at least one component required to route the call from the address of the endpoint connected to the first network to the edge of the first network is inoperable to route the call utilizing the enhanced address.

13. The method of claim 11, further comprising:
executing an application associated with the address of the endpoint connected to the first network; and
performing the step of creating the unique identifier by the application.

14. The method of claim 11, further comprising:
receiving, at the edge device, a call from the endpoint connected to the second network; and
in response to receiving the call from the endpoint connected to the second network, performing the steps of creating the unique identifier and storing the record comprising the unique identifier and address of the endpoint connected to the second network in the contact store.

15. The method of claim 11, further comprising, the step of creating a unique identifier by an application associated with the endpoint connected to the second network.

16. A method, comprising:
receiving a call from a second endpoint connected to a second network at an edge device configured to logically connect the second network to a first network and facilitate calls therebetween;
routing the call from the second endpoint to a first endpoint identified by an address in a first format associated with the second endpoint;
accessing a second address in a second format associated with the originator of the call from the second endpoint;
creating a unique identifier;
storing, in a contact store accessible upon the first network, a translation record associating the second address with the unique identifier; and
routing the call from the second endpoint to a first endpoint identified as the destination for the call from the second endpoint, utilizing the unique identifier.

17. The method of claim 16, further comprising, presenting on a display associated with the first endpoint a caller identification indicia determined from the second address in the second format.

18. The method of claim 16, further comprising:
concluding the call from the second endpoint;
receiving a dialing input on the first endpoint;
determining the dialing input indicates a call from the first endpoint to the unique identifier;
routing the call from the first endpoint to the edge device;
accessing the second address in the second format from the translation record associated with the unique identifier; and
routing the call from to the second endpoint utilizing the accessed second address in the second format.

19. The method of claim 18, wherein the first endpoint accesses the second address in the second format.

20. The method of claim 16, further comprising:
determining at least one component of the first network is inoperable to process calls utilizing the second address in the second format; and
in response to the determining step, performing the step of creating the unique identifier and storing the translation record.

* * * * *